Sept. 22, 1936.     C. C. FARMER     2,054,855

FLUID PRESSURE BRAKE

Filed Jan. 8, 1931     2 Sheets-Sheet 1

INVENTOR.
CLYDE C. FARMER
BY *Wm. M. Cady*
ATTORNEY.

Sept. 22, 1936.   C. C. FARMER   2,054,855
FLUID PRESSURE BRAKE
Filed Jan. 8, 1931   2 Sheets-Sheet 2

INVENTOR.
CLYDE C. FARMER
BY Wm. M. Cady
ATTORNEY.

Patented Sept. 22, 1936

2,054,855

UNITED STATES PATENT OFFICE 2,054,855

FLUID PRESSURE BRAKE

Clyde C. Farmer, Pittsburgh, Pa., assignor to The Westinghouse Air Brake Company, Wilmerding, Pa., a corporation of Pennsylvania Application January 8, 1931, Serial No. 507,396

24 Claims. (Cl. 303—66)

This case relates to fluid pressure brakes and more particularly to the type adapted to effect an application of the brakes upon a reduction in brake pipe pressure and to effect the release of the brakes upon an increase in brake pipe pressure.

In charging the usual fluid pressure brake equipment on a train, fluid under pressure is supplied to the brake pipe at the head end of the train and flows therefrom to the rear end of the train. Due to the length of the brake pipe and the resistance to the flow of fluid under pressure therethrough, the rate at which the rear end of the train is charged is relatively slow.

In order to augment the charging of the brake pipe at the rear end of the train, it is customary to first move the usual engineer's brake valve device to release position in which fluid at the high pressure carried in the main reservoir is supplied directly to the brake pipe and this high head of pressure at the front end of the train is adapted to drive fluid under pressure through the brake pipe to the rear end of the train so as to hasten the charging. However, as soon as the brake equipments at the head end of the train become nearly charged to the normal pressure carried from the high pressure in the main reservoir, the engineer's brake valve device is turned to running position in which the pressure of fluid supplied to the brake pipe is governed by the usual feed valve device.

According to one feature of my invention, I propose to further augment the charging of the brake pipe so as to hasten the release of brakes after an application. To accomplish this, I provide a reservoir on each car in the train which is normally charged with fluid under pressure, and further provide means which will be operated on cars at the head end of the train by the high rate of increase in brake pipe pressure to connect said reservoir to said brake pipe so as to permit a rapid flow of fluid under pressure from said reservoir to the brake pipe and thus locally increase the brake pipe pressure and materially aid in recharging the brake pipe on the train.

At the rear end of the train where the rate of increase in brake pipe pressure is relatively slow in charging the brake pipe, any leakage past the triple valve piston to the auxiliary reservoir makes it difficult to obtain a sufficient pressure differential between brake pipe on one side of said piston and auxiliary reservoir on the other side of said piston to move said piston and the slide valves, which are operated thereby, to release position. This difficulty is more pronounced in releasing after an emergency application of the brakes for the reason that the auxiliary reservoir pressure is higher than after a full service application due to the brake cylinder pressure being augmented in emergency by fluid under pressure from the emergency reservoir. In order to overcome this difficulty, the same means hereinbefore mentioned, are operated at the rear end of the train by the slow increase in brake pipe pressure to reduce the auxiliary reservoir pressure acting on one side of the triple valve piston sufficiently below the brake pipe pressure acting on the other side of said piston to cause said piston to promptly operate and move the triple valve parts to release position.

The emergency reservoir hereinbefore mentioned is charged with fluid under pressure supplied through the triple valve device and it is another object of my invention to permit fluid under pressure to flow back from the emergency reservoir to the auxiliary reservoir at the rear end of the train after the triple valve parts are moved to release position, so as to aid in quickly recharging the auxiliary reservoir. At the head end of the train where the emergency reservoir is connected to the brake pipe and the triple valve device is moved to a certain inner position, this back flow of fluid under pressure from the emergency reservoir to the auxiliary reservoir is prevented.

Another object of my invention is to provide improved means for preventing the high brake pipe pressure obtained in the brake pipe at the head end of the train, when charging the brake pipe, from blowing or lifting the triple valve slide valves from their seats.

Other objects and advantages will appear in the following more detailed description of my invention.

In the accompanying drawings.

As shown in the drawings, the brake equipment comprises a brake control valve device or triple valve device 1, an emergency valve device 2, and a release control valve device 3, said devices being preferably associated with each other within a single casing as shown in the drawings. The brake equipment further comprises an auxiliary reservoir 4, a supplemental or emergency reservoir 5, a brake cylinder 6 and a quick action chamber or reservoir 7.

The triple valve device 1 comprises a piston 8 having at one side a chamber 9 and having at the other side a chamber 10 connected to the auxiliary reservoir 4 through a passage and pipe 11, said chamber containing a main slide valve 12 and an auxiliary slide valve 13 adapted to be operated by said piston. Slidably mounted in one end of chamber 10 is a stop member 14 subject to the pressure of a spring 15 for urging said member into engagement with a shoulder 16. Projecting from the member 14 is a finger 17 adapted to engage the end of the main slide valve 12. Projecting into chamber 9 is a spring-pressed stop 18 having ports 19 for establishing communication from said chamber to chamber 20 which is open to the brake pipe 21 through a passage 22.

The emergency valve device 2 comprises a piston 23 having at one side a chamber 24 and at the other side a chamber 25 connected to the quick action reservoir 7 through a passage and pipe 26, and containing a main slide valve 27 and an auxiliary slide valve 28 adapted to be operated by said piston. Projecting into piston chamber 24 is a spring-pressed stop 29 having a port 30 which is adapted to establish communication from piston chamber 24 to chamber 31 which is open to the brake pipe 21 through passage 22.

The release control valve device 3 comprises a flexible diaphragm 32 mounted between a face on the casing and a cover plate 33. The diaphragm 32 has at one side a chamber 34 and at the other side a chamber 35 containing a slide valve 36 which is operatively mounted between a pair of spaced shoulders 37 in a stem 38. The stem 38 is provided at one end with an enlarged head portion 39 to which the diaphragm is secured by a member having an enlarged head 40 in chamber 34 and a stem 41 extending through the diaphragm and having screw-threaded engagement in said stem, so that deflection of said diaphragm in either direction is adapted to move the slide valve 36.

Chamber 34 of the release control device is connected by a passage 42 to valve chamber 10 of the triple valve device and contains a stop 43 which projects inwardly from the cover plate 33 and is adapted to limit deflection of diaphragm 32 toward the left hand against the pressure of a spring 44.

The valve chamber 35 of the release control device is open through passage 22 to brake pipe 21 and projecting into said chamber in line with the diaphragm stem 38 is a stop member 45 subject to the pressure of a spring 46 and adapted to engage the end of stem 38. For holding the slide valve 36 seated, said slide valve is subjected to the pressure of a spring-pressed roller 47.

In operation, in order to charge the brake equipment, fluid under pressure is supplied to the brake pipe 21 in the usual well known manner and flows therefrom through passage 22 to chamber 20 of the triple valve device 1, and from said chamber to piston chamber 9. Fluid under pressure also flows from passage 22 to diaphragm chamber 35 of the release control valve device 3 and to piston chamber 24 of the emergency valve device 2.

Figure 1:
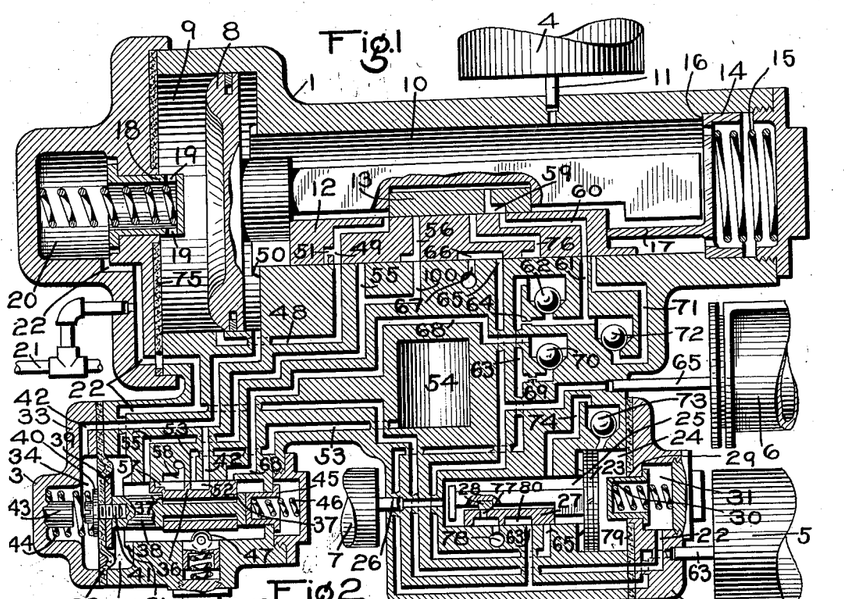
Fig. 1 is a diagrammatic view, mainly in section, of a fluid pressure brake equipment embodying my invention and showing the devices in their release position.
Figure 2:
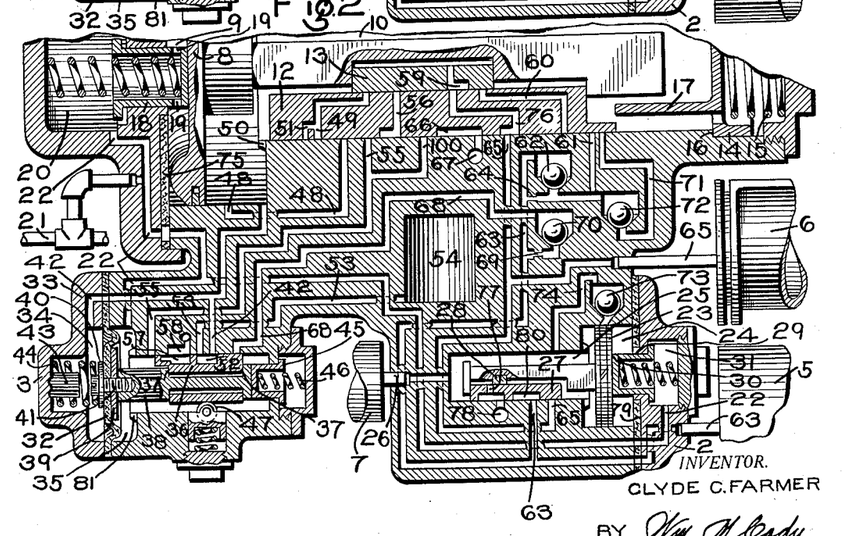
Fig. 2 is a diagrammatic view of the equipment shown in Fig. 1, but with the various devices shown in service position.
Figure 4:
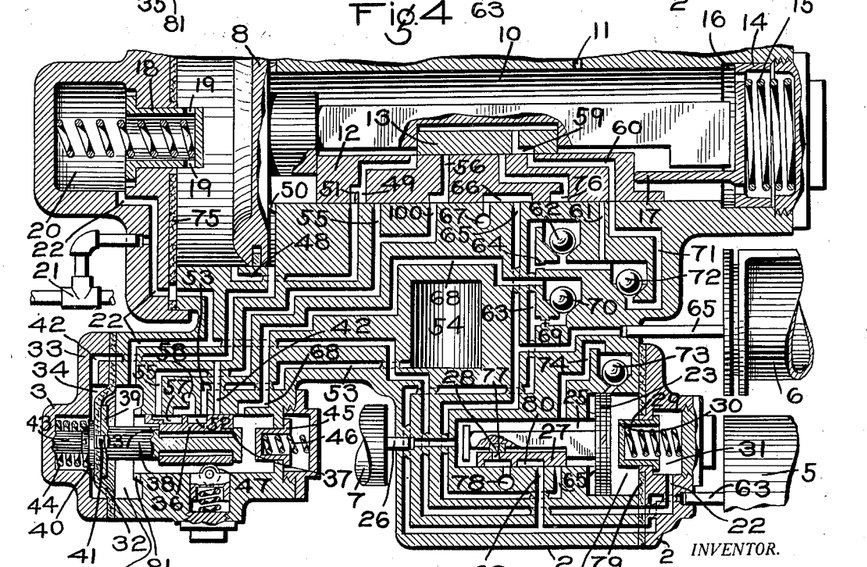
Fig. 4 is a diagrammatic view of the equipment shown in Fig. 1 but with the various parts shown in an inner or retarded recharge position.

According to my invention, the triple valve device has a full release position as shown in Fig. 1 of the drawings, to which position the triple valve piston is moved by the relatively slow rate of increase in brake pipe pressure at the rear end of the train in charging the brake pipe, and an inner or retarded recharge position, as shown in Fig. 4 of the drawings, to which position the triple valve piston is moved by the rapid rate of increase in brake pipe pressure at the front end of the train. The release control device 3 also is moved to a different position at the front end of the train by the rapid rate of increase in brake pipe pressure, than it assumes at the rear end of the train where the rate of increase is lower, as will now be described.

At the rear end of the train where the rate of increase in brake pipe pressure is relatively slow in charging the brake pipe, the correspondingly slow build up of pressure in piston chamber 9 cause the triple valve piston 8 and slide valves 12 and 13 to move to the full release position shown in Fig. 1 of the drawings, in which position further movement is prevented by engagement with member 14 which is subject to the pressure of spring 15. In this position fluid under pressure flows from piston chamber 9 through passage 48 to the seat of the main slide valve 12 and from thence through port 49 in said slide valve to valve chamber 10, from which fluid under pressure flows to the auxiliary reservoir 4 by way of passage and pipe 11, thus charging said reservoir. Fluid under pressure also flows from valve chamber 10 through port 59 in the auxiliary slide valve 13, port 60 in the main slide valve 12, passage 61, past ball check valve 62 and through passage and pipe 63 to the emergency reservoir 5, thus charging said reservoir with fluid at brake pipe pressure. In this position of the triple valve slide valve 12, the brake cylinder 6 is opened to the atmosphere through pipe and passage 65, cavity 66 in said slide valve and an atmospheric passage 67.

The diaphragm chamber 35 of the release control valve device 3 being connected to the brake pipe 21 through passage 22, and the diaphragm chamber 34 being connected to the triple valve chamber 10 through passage 42, the pressure of fluid in said diaphragm chambers at the rear end of the train also increases at the same rate as the auxiliary reservoir and brake pipe pressures increase, and as a result said device is maintained in the position shown in Fig. 1 by the opposing pressures of springs 44 and 46. In this position, a reduction insuring chamber 54 is supplied with fluid at auxiliary reservoir pressure from the triple valve slide valve chamber 10 by way of passage 42, cavity 52 in the slide valve 36 and passage 53. Fluid at brake pipe pressure is also supplied from the release control valve chamber 35 through a passage 55 to the seat of the triple valve slide valve 12, and from passage 55 through a branch 100 to a port 56 in the main slide valve connecting to the seat of the auxiliary slide valve 13, the purpose of which will be hereinafter described.

At the front end of the train where the rate of charging the brake pipe is rapid, the flow capacity of the auxiliary reservoir charging port 49 in the main slide valve 12 is inadequate to prevent a high pressure from building up in the piston chamber 9, and as a result, this high pressure acting on the triple valve piston 8 moves said piston and the slide valves 12 and 13 to their inner or retarded recharge position, as shown in Fig. 4 of the drawings; thereby shifting the member 14 toward the right hand against the opposing pressure of spring 15. In this position the flow of fluid under pressure through passage 48 to valve chamber 10 and the auxiliary reservoir 4 is retarded by the small flow area of port 51 which branches from port 49 and registers with passage 48. From valve chamber 10, fluid under pressure also flows through port 59 in the auxiliary slide valve 13, port 60 in the main slide valve, a passage 71, past a ball check valve 72 and from thence through passage 61, past ball check valve 62 and through passage and pipe 63 to the emergency reservoir 5, thereby charging said reservoir.

The more rapid rate of increase in brake pipe pressure in diaphragm chamber 35 than in chamber 34 of the release control valve device at the head end of the train, deflects diaphragm 32 to its left hand position, shown in Fig. 4, against the lower auxiliary reservoir pressure in diaphragm chamber 34 and the pressure of spring 44. In this left hand position of the release control slide valve 36, the passage 55, having the branch 100, is connected to an atmospheric port 58 through a cavity 57 in said slide valve. Passage 55 connects to the seat of the main triple valve slide valve 12 and the branch 100 connects through port 56 in said slide valve to the seat of the auxiliary slide valve 13. Thus a predetermined seated area of the slide valves 12 and 13 is exposed to atmospheric pressure which is adapted to increase the seating pressure of said slide valves, so that the high brake pipe pressure in passage 48 can not blow or lift said slide valves from their seats when charging the brake pipe at the head end of the train.

In this left hand position of the release control slide valve 36, the reservoir or volume 54 is opened to the atmosphere and a passage 68 is uncovered, the purpose of which will be hereinafter fully described in releasing the brakes after an application. When the brake pipe 21 and auxiliary reservoir 4 become substantially fully charged to the pressure carried in the brake pipe, spring 44 of the release control device deflects the diaphragm 32 toward the right hand until stem 38 engages the stop 45, in which position passage 55 is uncovered and fluid at brake pipe pressure is permitted to flow from valve chamber 35 through said passage and its branch 100 to the seat of the main slide valve 12 and to the seat of the auxiliary slide valve 13, so as to reduce the seating pressure of said valves to normal so that said valves can be moved by a predetermined pressure differential on the piston 8 in effecting a service application of the brakes, as will be hereinafter described. In this normal position of the release control slide valve 36, the reservoir 54 is connected to valve chamber 10 through passage 53, cavity 52 in said slide valve and passage 42 so as to charge said reservoir with fluid at auxiliary reservoir pressure, and said slide valve also laps the passage 68.

In the retarded recharge position of the triple valve device 1, as shown in Fig. 4, the brake cylinder 6 is open to the atmosphere in the same manner as in full release position, shown in Fig. 1.

The emergency valve device 2 operates in the same manner, irrespective of its position in the train. In charging the brake pipe, fluid under pressure flows from the brake pipe through passage 22 to the emergency piston chamber 24 and with the emergency piston in its release position, as shown in Fig. 1, fluid under pressure flows from the piston chamber 24, past the ball check valve 73 and through passage 74 to valve chamber 25 and from thence through passage and pipe 26 to the usual quick action chamber or reservoir 7, thereby charging said chambers to brake pipe pressure.

If it is desired to effect a service application of the brakes, the pressure of fluid in the brake pipe 21 is gradually reduced in the usual well known manner and since the triple valve piston chamber 9, the release control valve diaphragm chamber 35 and emergency piston chamber 24 are connected by passage 22 to the brake pipe 21, the pressure of fluid in said chambers reduces with the brake pipe pressure.

Upon a predetermined reduction in brake pipe pressure in the triple valve piston chamber 9, the triple valve piston 8 is shifted by auxiliary reservoir pressure in valve chamber 10 and moves the slide valves 12 and 13 to service position in which said piston engages a gasket 75.

In service position of the triple valve slide valves 12 and 13, port 59 in the auxiliary slide valve 13 registers with a port 76 through the main slide valve, which in turn, registers with the brake cylinder passage 65, so that fluid under pressure is permitted to flow from the auxiliary reservoir 4 through pipe and passage 11 and valve chamber 10 to the brake cylinder 6 and thus causes the brakes to be applied.

The release control valve device 3 does not move from its normal position shown in Fig. 1 of the drawings when a service application of the brakes is effected. The pressure of spring 46 on the stop member 45 is such that any differential pressure between the auxiliary reservoir and brake pipe, which may be produced in effecting a service reduction in brake pipe pressure, is not sufficient to overcome the pressure of said spring, so that the diaphragm 32 is maintained in its normal position.

Upon a service rate of reduction in brake pipe pressure and in the pressure in the emergency piston chamber 31, the pressure of fluid in the emergency valve chamber 25 shifts the emergency piston 23 and auxiliary slide valve 28 toward the right hand into engagement with the spring-pressed stop 29, in which position, port 77 through the main slide valve 27 is uncovered which permits fluid under pressure to vent from the quick action chamber 7 through pipe and passage 26, valve chamber 25, through port 27 and passage 78 to the atmosphere, thereby reducing the pressure in valve chamber 25 at the same rate as the brake pipe pressure is being reduced in the piston chamber 24, which stops the movement of the emergency piston in the service position.

In order to effect the release of the brakes after a service application, the brake pipe pressure is increased by operation of the brake valve device on the locomotive. On cars at the head end of the train where the increase in brake pipe pressure is rapid, the release control valve device 3 and triple valve device 1 are shifted to the position shown in Fig. 4. In this left hand position of the release control device 3, passage 68 is uncovered, which permits fluid under pressure to flow from the normally charged emergency reservoir 5 through pipe and passage 63, a choked passage 69, past a ball check valve 70 and through passage 68 to the release control valve chamber 35 from whence fluid under pressure flows through passage 22 to the brake pipe 21, thereby accelerating the rate of increase in brake pipe pressure. The ball check valve 70 is interposed between passage 68 and the choked passage 69 so as to prevent charging of the emergency reservoir from the brake pipe after the brake pipe pressure is increased to a degree higher than the reduced emergency reservoir pressure. In this position of the slide valve 36, the reservoir 54 is opened to the atmosphere through cavity 52 in slide valve 36 and the atmospheric passage 58. Passage 55 is also opened to the atmospheric passage 58 through cavity 57 in the slide valve 36 so that with the triple valve device in the inner position, the seating pressure of the slide valves 12 and 13 is increased, as hereinbefore fully described.

With the triple valve device in the inner position shown in Fig. 4, fluid under pressure flows from the brake pipe through passage 48 and ports 51 and 49 in the main slide valve to valve chamber 10 and from thence through passage and pipe 11 to the auxiliary reservoir 4. Fluid under pressure also flows from valve chamber 10 through port 59 in the auxiliary slide valve 13, port 60 in the main slide valve 12 and passage 71 to the under side of the ball check valve 72. The upper side of the check valve 72 is subject to the pressure of fluid in the emergency reservoir 5 by reason of the connection through port 61, the restriction 64 and passage and pipe 63. As soon as the emergency reservoir pressure acting on the upper side of the check valve 72 is reduced, by flow to the brake pipe through the release control device 3, to a degree less than that in passage 71, said check valve is lifted and fluid under pressure then flows from the valve chamber 10 to the emergency reservoir, thereby charging said reservoir.

The check valve 72 is provided to prevent flow of fluid under pressure from the emergency reservoir 5 back to the valve chamber 10 and auxiliary reservoir 4 when the brake pipe is being recharged and the brakes are being released at the head end of the train.

When the pressure differential acting on the release control valve diaphragm 32 is reduced to a predetermined degree by an increase in auxiliary reservoir pressure in diaphragm chamber 34, spring 44 returns the diaphragm 32 and slide valve 36 to the normal position, shown in Fig. 1, in which fluid under pressure is again supplied from the valve chamber 10 to reservoir 54. Passage 68 is lapped in this position of slide valve 36 and passage 55 is connected to the valve chamber 35.

On cars at the rear end of the train where the rate of increase in brake pipe pressure is relatively slow; the release control valve device 3 remains in its normal position, but the triple valve piston 8 and slide valves 12 and 13 are shifted to their full release position, as shown in Fig. 1.

In full release position of the triple valve slide valves, fluid under pressure is supplied from the brake pipe to the valve chamber 10 and auxiliary reservoir 4 through passage 48 and through port 49 in the main slide valve, and also, fluid under pressure is permitted to flow back from the emergency reservoir 5 to valve chamber 10 and the auxiliary reservoir by way of pipe and passage 63, through restriction 64, passage 61, port 60 in the main slide valve and port 59 in the auxiliary slide valve. The auxiliary reservoir pressure is thus rapidly increased a predetermined amount and after equalization of the pressures in said reservoirs, both reservoirs are charged up to brake pipe pressures, with fluid from the brake pipe supplied to valve chamber 10, fluid under pressure flowing from said valve chamber to the emergency reservoir 5, by way of port 59 in the slide valve 13, through port 60 in slide valve 12, passage 61, past the ball check valve 62 and through passage and pipe 63.

At both the front end and the rear end of the train, the movement of the triple valve device by the increase in brake pipe pressure opens communication from the brake cylinder 6 to the atmosphere through pipe and passage 65, cavity 66 in the main slide valve 12 and the atmospheric port 67, so as to vent fluid under pressure from said brake cylinder to effect a release of the brakes. The increase in brake pipe pressure shifts the emergency piston 23 and auxiliary slide valve 28 back to release position in which the valve chamber 25 and quick action chamber 7 are recharged with fluid at the pressure carried in the brake pipe.

When a sudden reduction in brake pipe pressure is produced in order to effect an emergency application of the brakes, the triple valve piston 8 is shifted to its outer position in which fluid under pressure is permitted to flow from the auxiliary reservoir to the brake cylinder as in effecting a service application of the brakes. This sudden reduction in brake pipe pressure also causes the emergency piston 23 to move to emergency position and engage the gasket 79, since the brake pipe pressure is vented at a greater rate than fluid is vented from the valve chamber 25 through the atmospheric passage 78. In emergency position of the main slide valve 27, a cavity 80 connects passage 63 from the emergency reservoir 5 to the brake cylinder passage 65, so that fluid under pressure from the emergency reservoir 5 is permitted to equalize into the brake cylinder 6 with the connected auxiliary reservoir 4, thereby producing a higher brake cylinder pressure than is obtained when a service application of the brakes is effected, in which case fluid under pressure from only the auxiliary reservoir is supplied to the brake cylinder, and the emergency reservoir is isolated.

In emergency position of the emergency valve device, fluid under pressure gradually flows from valve chamber 25 and the connected quick action reservoir 7 to the atmosphere through port 77 in the main slide valve 27, which port is uncovered by the auxiliary slide valve 28 and registers with the atmospheric passage 78. When the pressure in valve chamber 25 is thus reduced to substantially that of the atmosphere, the spring-pressed stop 29 shifts the piston 23 and slide valves 27 and 28 back to emergency lap position in which the emergency reservoir passage 63 is disconnected from the brake cylinder passage 65, but this does not occur until after equalization of fluid under pressure from the emergency reservoir into the brake cylinder.

The sudden reduction in brake pipe pressure in diaphragm chamber 35 of the release control valve device, permits auxiliary reservoir pressure in chamber 34 to deflect the diaphragm 32 to emergency position in which the stop member 45 is moved toward the right hand, compressing spring 46, this movement being limited by engagement of the enlarged head portion 39 of the stem 38 with a rib 81 in the casing. With the release control slide valve 36 in emergency position, the reservoir 54 is connected to the atmosphere through passage 53, cavity 52 in said slide valve and the atmospheric port 58, thereby venting fluid under pressure from said reservoir to the atmosphere.

In order to effect a release of the brakes after an emergency application, the brake pipe pressure is increased by operation of the brake valve device on the locomotive. On cars at the head end of the train where the rate of increase in brake pipe pressure is rapid, the release control valve device is shifted to its left hand position, compressing spring 44, and the triple valve device is moved to the retarded recharge position, as shown in Fig. 4. With the release control valve device and triple valve device in these positions, fluid at the reduced pressure in the emergency reservoir 5 is permitted to flow to the brake pipe 21 through passage 63, choked passage 69, past the check valve 70, through passage 68, which is uncovered by the slide valve 36, to chamber 35 and from thence through passage 22 to brake pipe 21, thereby accelerating the rate of increase in brake pipe pressure. At the same time, fluid under pressure is supplied through passage 48 to the triple valve chamber 10 and auxiliary reservoir 4 and when the pressure in said chamber exceeds the reduced pressure in the emergency reservoir 5, fluid under pressure flows from said chamber through port 59 in the auxiliary slide valve 13, port 60 in the main slide valve 12, through passage 71, past the ball check valve 72, through passage 61, past ball check valve 62 and through passage and pipe 63 to the emergency reservoir, thereby charging said reservoir.

In the left hand position of the release control slide valve 36, the triple valve slide valve loading passage 55 is open to the atmosphere and the reservoir 54 is opened to the atmosphere, but after a predetermined build up in auxiliary reservoir pressure in diaphragm chamber 34 is obtained, the spring 44 returns the release control device to its normal position, as shown in Fig. 1, in which position, passage 55 is connected to valve chamber 35, the emergency reservoir passage 68 is lapped and the reservoir 54 is connected to the valve chamber 10 so as to charge the reservoir with fluid under pressure from said chamber. The brake cylinder 6 is opened to the atmosphere through pipe and passage 65, cavity 66 in the triple valve slide valve 12 and the atmospheric port 67, so that fluid under pressure is vented from said brake cylinder so as to effect a release of the brakes.

Figure 3:
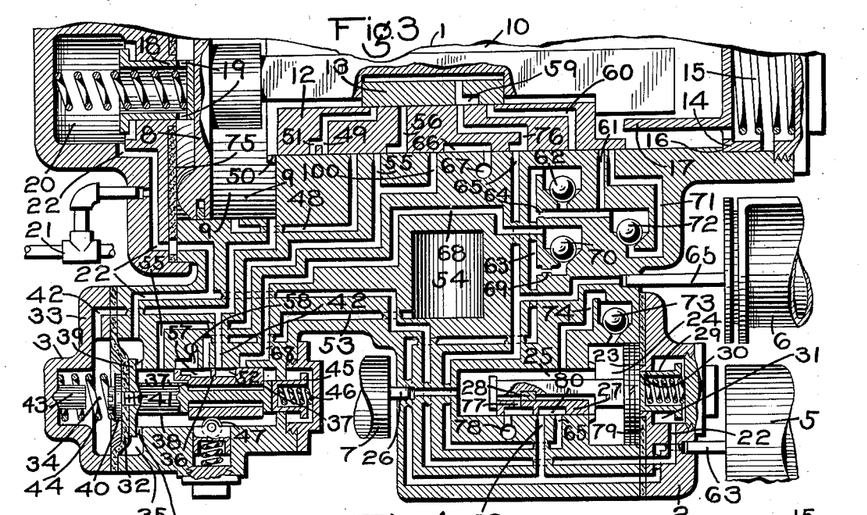
Fig. 3 is a diagrammatic view of the equipment shown in Fig. 1 but with the parts shown in emergency position.

On cars at the rear end of the train where the rate of increase in brake pipe pressure is relatively slow, the release control valve device is shifted from the emergency position, shown in Fig. 3, to full release position, shown in Fig. 1, before the triple valve device moves from emergency position. As hereinbefore described, it is especially difficult to move the triple valve piston to release position by the slow rate of increase in brake pipe pressure at the rear end of the train in releasing the brakes after an emergency application. According to my invention, however, the release control device is more sensitive to an increase in brake pipe pressure, and when in its right hand, emergency position, is subject to the pressure of spring 46, so that when the combined force of brake pipe pressure in chamber 35, acting on the diaphragm 32, and spring 46 slightly overbalances the auxiliary reservoir pressure in chamber 34, the release control valve diaphragm 32 and slide valve 36 are returned to their normal position shown in Fig. 1, in which position, the pressure of said spring is prevented from acting on the stem 38 due to the limited movement of the stop member 45. On account of thus rendering spring 46 ineffective, the movement of the slide valve 36 ceases, and in this position, the reservoir or chamber 54 is connected to the auxiliary reservoir 4 through passage 53, cavity 52 in said slide valve, passage 42 and through the triple valve chamber 10. The chamber 54 being opened to the atmosphere when the release control valve device is in emergency position, the connecting of this vented chamber to the valve chamber 10 of the triple valve device, in releasing the brakes after an emergency application, permits fluid under pressure to equalize from the auxiliary reservoir 4 and valve chamber 10 into the chamber 54. The pressure of fluid in valve chamber 10 is thus reduced sufficiently below the brake pipe pressure acting in the piston chamber 9 to cause the piston 8 to operate and move the slide valves 12 and 13 to their full release position, shown in Fig. 1.

In the full release position of the triple valve device the brake cylinder 6 is opened to the atmosphere through pipe and passage 65, cavity 66 in the slide valve 12 and the atmospheric passage 67, so that fluid under pressure is vented from said brake cylinder in order to effect a release of the brakes.

An object of the spring 46 of the release control device is to aid in moving the slide valve 36 from emergency position to the release position as above described, and another object is to prevent movement of the release control slide valve from the release position to the emergency position upon a service rate of reduction in brake pipe pressure in diaphragm chamber 35. Spring 44 is provided to move the slide valve 36 from its left hand position to its normal position upon substantial equalization of brake pipe pressure in chamber 35 and auxiliary reservoir pressure in chamber 34 in charging the brake equipment at the head end of the train.

It will be noted that my improved valve device operates to accelerate the charging of the brake equipments and the release of the brakes on a train by supplying fluid under pressure from a normally charged reservoir to the brake pipe at the head end of the train, and at the rear end of the train the charging of the brake equipments and the release of brakes after a service application is hastened by permitting fluid under pressure to flow back from the normally charged reservoir 5 to the auxiliary reservoir 4. Furthermore, the release of brakes at the rear end of the train after an emergency application is ensured by reducing auxiliary reservoir pressure a predetermined degree below brake pipe pressure so as to obtain the necessary pressure differential for moving the triple valve device to release position. One valve device controls the above functions and said valve device selectively operates to different positions in accordance with its location in a train.

The choke or restriction 64 is provided to limit the rate of back flow of fluid under pressure from the emergency reservoir to valve chamber 10 and auxiliary reservoir 4, in releasing the brakes, to the same or a lower rate than the brake pipe pressure is increased in piston chamber 9, so as to prevent an undesired movement of the triple valve device to service position, in which the brakes would be applied.

The choke or restriction 69 so governs the flow of fluid under pressure from the emergency reservoir to the brake pipe at the head end of the train when releasing the brakes, as to limit the number of cars at the front end of the train upon which the triple valve devices will move to the retarded recharge position and thereby insure a more rapid and synchronous recharge of the whole train and consequent release of the brakes.

It will be evident that by reason of the restriction 64, the rate of back flow from the supplemental or emergency reservoir 5 to the auxiliary reservoir is reduced, when the moving parts of the triple valve move back from application position to normal release position, so that further movement of the parts from the normal to the inner release position is not materially resisted.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake, the combination with a brake pipe, a brake cylinder, an auxiliary reservoir, and another reservoir, of a triple valve device for supplying fluid under pressure from said auxiliary reservoir to said brake cylinder to effect an application of the brakes, and for venting fluid under pressure from said brake cylinder to effect a release of the brakes, said triple valve device having one release position in which fluid under pressure is supplied from said other reservoir to the auxiliary reservoir and from said brake pipe to both of said reservoirs and another release position in which fluid under pressure is supplied from said brake pipe to both of said reservoirs, means for preventing back flow from said other reservoir to the auxiliary reservoir in the second mentioned release position, said triple valve device being operated in accordance with variations in brake pipe pressure.

2. In a fluid pressure brake, the combination with a brake pipe, a brake cylinder, an auxiliary reservoir, and another reservoir, of a triple valve device for supplying fluid under pressure from said auxiliary reservoir to said brake cylinder to effect an application of the brakes, and for venting fluid under pressure from said brake cylinder to effect a release of the brakes, said triple valve device being operative to one or the other of two different release positions in accordance with the increase in brake pipe pressure for supplying fluid under pressure from said brake pipe to both of said reservoirs, and means for preventing back flow of fluid under pressure from said other reservoir to said auxiliary reservoir in one of said release positions.

3. In a fluid pressure brake, the combination with a brake pipe, a brake cylinder, an auxiliary reservoir, and another reservoir, of a triple valve device for supplying fluid under pressure from said auxiliary reservoir to said brake cylinder to effect an application of the brakes, and for venting fluid under pressure from said brake cylinder to effect a release of the brakes, said triple valve device being operative to a release position upon a certain increase in brake pipe pressure for supplying fluid under pressure from said other reservoir to said auxiliary reservoir and for supplying fluid under pressure from said brake pipe to both of said reservoirs, means for restricting the flow of fluid from said other reservoir to said auxiliary reservoir, said triple valve device being operative to another release position upon a more rapid increase in brake pipe pressure for supplying fluid under pressure from said brake pipe to both of said reservoirs, and means for preventing flow of fluid under pressure from said other reservoir to the auxiliary reservoir in the second mentioned release position.

4. In a fluid pressure brake, the combination with a brake pipe, a brake cylinder, an auxiliary reservoir normally charged with fluid under pressure from said brake pipe and another reservoir normally charged with fluid under pressure from said brake pipe, of a brake controlling valve means operative upon a reduction in brake pipe pressure for supplying fluid under pressure from both of said reservoirs to said brake cylinder to effect an application of the brakes and operative upon an increase in brake pipe pressure to vent fluid under pressure from said brake cylinder to effect a release of the brakes and to supply fluid under pressure to both of said reservoirs, valve means operative upon an increase in brake pipe pressure to establish a communication through which fluid under pressure is adapted to flow from said other reservoir to said brake pipe, and a check valve for preventing back flow of fluid from the brake pipe to said other reservoir through the communication through which fluid is supplied from said reservoir to the brake pipe when the brake pipe pressure is higher than the pressure in said other reservoir.

5. In a fluid pressure brake, the combination with a brake pipe, a brake cylinder, an auxiliary reservoir, and another reservoir, of a triple valve device operative upon a reduction in brake pipe pressure to supply fluid under pressure from said auxiliary reservoir to said brake cylinder to effect an application of the brakes and operative upon an increase in brake pipe pressure to vent fluid under pressure from said brake cylinder to effect a release of the brakes and to supply fluid under pressure to both of said reservoirs, a valve device operative upon a rapid rate of increase in brake pipe pressure for supplying fluid under pressure from said other reservoir to said brake pipe to augment the charging of said brake pipe, and valve means for preventing back flow of fluid under pressure from said brake pipe to said other reservoir when the brake pipe pressure is higher than the pressure in said other reservoir.

6. In a fluid pressure brake, the combination with a brake pipe, a brake cylinder, an auxiliary reservoir, and another reservoir, of a triple valve device operative upon a reduction in brake pipe pressure to supply fluid under pressure from said auxiliary reservoir to said brake cylinder to effect an application of the brakes and operative upon an increase in brake pipe pressure to vent fluid under pressure from said brake cylinder to effect a release of the brakes and to supply fluid under pressure to both of said reservoirs, a valve device operated by a rapid rate of increase in brake pipe pressure for establishing a communication through which fluid under pressure flows from said other reservoir to said brake pipe to augment the charging of said brake pipe, a choke in said communication for restricting the flow of fluid under pressure from said reservoir to said brake pipe, and a check valve in said communication for preventing back flow.

7. In a fluid pressure brake, the combination with a brake pipe, a brake cylinder, an auxiliary reservoir, and another reservoir, of a triple valve device operative upon a reduction in brake pipe pressure to supply fluid under pressure from said auxiliary reservoir to said brake cylinder to effect an application of the brakes and operative upon an increase in brake pipe pressure to vent fluid under pressure from said brake cylinder to effect a release of the brakes and to supply fluid under pressure to both of said reservoirs, a valve device operated by a rapid rate of increase in brake pipe pressure for establishing a communication through which fluid under pressure flows from said other reservoir to said brake pipe to augment the charging of said brake pipe, a choke in said communication for restricting the flow of fluid under pressure from said reservoir to said brake pipe, and a check valve in said communication for preventing back flow, said valve device being inoperative by a relatively slow rate of increase in brake pipe pressure.

8. In a fluid pressure brake, the combination with a brake pipe, a brake cylinder, an auxiliary reservoir and another normally charged reservoir, of a triple valve device operative upon a reduction in brake pipe pressure to supply fluid under pressure from said auxiliary reservoir to said brake cylinder to effect an application of the brakes and operative upon an increase in brake pipe pressure to vent fluid under pressure from said brake cylinder to effect a release of the brakes, said triple valve device being operative upon a slow rate of increase in brake pipe pressure to establish a communication through which fluid under pressure is permitted to flow back from said normally charged reservoir to said auxiliary reservoir and to supply fluid under pressure from said brake pipe to both of said reservoirs, said triple valve device being operative upon a faster rate of increase in brake pipe pressure to supply fluid under pressure from said brake pipe to both of said reservoirs, a check valve for preventing back flow from said other reservoir to said auxiliary reservoir when the triple valve device is operated by the faster rate of increase in brake pipe pressure, and valve means operative by said faster rate of increase in brake pipe pressure for permitting flow of fluid under pressure from said normally charged reservoir to said brake pipe for augmenting the charging of said brake pipe.

9. In a fluid pressure brake, the combination with a brake pipe, a brake cylinder, an auxiliary reservoir and a normally charged reservoir, of a triple valve device operative upon a reduction in brake pipe pressure to supply fluid under pressure from said auxiliary reservoir to said brake cylinder to effect an application of the brakes and operative upon an increase in brake pipe pressure to vent fluid under pressure from said brake cylinder to effect a release of the brakes, said triple valve device being operative upon a slow rate of increase in brake pipe pressure to establish a communication through which fluid under pressure is permitted to flow back from said normally charged reservoir to said auxiliary reservoir, and to supply fluid under pressure from said brake pipe to both of said reservoirs, a choke for restricting said back flow, a passage by-passing said choke for permitting unrestricted flow of fluid under pressure from said triple valve device to said other reservoir, a check valve in said passage, said triple valve device being operative upon a faster rate of increase in brake pipe pressure to establish communication through which fluid under pressure is supplied to both of said reservoirs, a check valve for preventing back flow of fluid under pressure from said other reservoir to said auxiliary reservoir when the triple valve device is operated by said faster rate of increase in brake pipe pressure, a valve device operated by the differential of auxiliary reservoir pressure and said faster rate of increase in brake pipe pressure for establishing a communication through which fluid under pressure is supplied from said other reservoir to said brake pipe, a choke in said communication for governing the rate of supply to said brake pipe, and a check valve in said communication for preventing back flow when the brake pipe pressure becomes higher than the pressure in said other reservoir.

10. In a fluid pressure brake, the combination with a brake pipe, a brake cylinder, and an auxiliary reservoir, of a triple valve device operative by the difference in pressure in the auxiliary reservoir and the brake pipe upon a reduction in brake pipe pressure to supply fluid under pressure from said auxiliary reservoir to said brake cylinder to effect an application of the brakes, and operative by the difference in said pressures upon an increase in brake pipe pressure to vent fluid under pressure from said brake cylinder to effect a release of the brakes, a reservoir, a spring, valve means operative upon a sudden reduction in brake pipe pressure to open said reservoir to the atmosphere and operative, before said triple valve device operates, by an increase in brake pipe pressure and the pressure of said spring to a position in which said spring is rendered ineffective and in which said reservoir is connected to said auxiliary reservoir for effecting a predetermined reduction in auxiliary reservoir pressure to facilitate movement of the triple valve device to release the brakes by the increase in brake pipe pressure at a lower degree.

11. In a fluid pressure brake, the combination with a brake pipe, a brake cylinder, an auxiliary reservoir, and another reservoir, of a triple valve device operative by the difference in pressure in said auxiliary reservoir and brake pipe upon a reduction in brake pipe pressure to supply fluid under pressure from said auxiliary reservoir to said brake cylinder to effect an application of the brakes and operative by the difference in said pressures upon an increase in brake pipe pressure to vent fluid under pressure from said brake cylinder to effect a release of the brakes, said triple valve device being movable to one release position by the relatively slow rate of increase in brake pipe pressure at the rear end of the train for permitting flow of fluid under pressure from said other reservoir to said auxiliary reservoir at a restricted rate, and for supplying fluid under pressure from said brake pipe to both of said reservoirs, and movable to another release position upon a faster rate of increase in brake pipe pressure at the head end of a train for supplying fluid under pressure from the brake pipe to both of said reservoirs, a check valve for preventing back flow of fluid under pressure from said other reservoir to the auxiliary reservoir in the second mentioned release position, a third reservoir, valve means operated upon a sudden reduction in brake pipe pressure to open said third reservoir to the atmosphere and operative by the relatively slow increase in brake pipe pressure at the rear end of the train to connect said third reservoir to said auxiliary reservoir for effecting a predetermined reduction in auxiliary reservoir pressure to facilitate the movement of the triple valve device to the first mentioned release position by a low brake pipe pressure, said valve means being operated by the faster rate of increase in brake pipe pressure at the head end of the train to another position for venting fluid under pressure from said other reservoir to said brake pipe to hasten the recharging of said brake pipe.

12. In a fluid pressure brake, the combination with a brake pipe, a chamber adapted to be charged with fluid under pressure from said pipe and a slide valve having a seat and normally pressed into engagement with said seat by the pressure of fluid in said chamber, of a passage connecting said pipe to the seat of said slide valve, said slide valve having a port adapted to register with said passage for establishing communication through which fluid under pressure flows from said pipe to said chamber, and valve means governed by variations in brake pipe pressure for controlling the seating pressure of said slide valve.

13. In a fluid pressure brake, the combination with a brake pipe, a chamber adapted to be charged with fluid under pressure from said pipe and a slide valve having a seat and normally pressed into engagement with said seat by the pressure of fluid in said chamber, of a passage connecting said pipe to the seat of said slide valve, said slide valve having a port adapted to register with said passage for establishing communication through which fluid under pressure flows from said pipe to said chamber, and valve means operated by an increase in brake pipe pressure for subjecting a limited area of the seating face of said slide valve to atmospheric pressure for increasing the seating pressure of said slide valve.

14. In a fluid pressure brake, the combination with a brake pipe, a chamber adapted to be charged with fluid under pressure from said pipe and a slide valve having a seat and normally pressed into engagement with said seat by the pressure of fluid in said chamber, of a passage connecting said pipe to the seat of said slide valve, said slide valve having a port adapted to register with said passage for establishing communication through which fluid under pressure flows from said pipe to said chamber, and valve means operated by a rapid rate of increase in brake pipe pressure for subjecting a limited area of the seating face of said slide valve to atmospheric pressure for increasing the seating pressure of said slide valve.

15. In a fluid pressure brake, the combination with a brake pipe, a chamber adapted to be charged with fluid under pressure from said pipe and a slide valve having a seat and normally pressed into engagement with said seat by the pressure of fluid in said chamber, of a passage connecting said pipe to the seat of said slide valve, said slide valve having a restricted port adapted to register with said passage for establishing communication through which fluid under pressure is supplied to said chamber, and means for preventing the pressure of fluid in said passage from pushing said valve from its seat, said means comprising a fluid pressure operated valve for at one time subjecting a limited area of the seating face of said slide valve to atmospheric pressure.

16. In a fluid pressure brake, the combination with a brake pipe, a chamber adapted to be charged with fluid under pressure from said pipe and a slide valve having a seat and normally pressed into engagement with said seat by the pressure of fluid in said chamber, of a passage connecting said pipe to the seat of said slide valve, said slide valve having a restricted port adapted to register with said passage for establishing communication through which fluid under pressure is supplied to said chamber, and means for preventing the pressure of fluid in said passage from pushing said valve from its seat, said means comprising a valve having one position for connecting a portion of the seating face of said slide valve to the atmosphere and another position for closing said connection, and a movable abutment for moving said valve to one or the other of said positions in accordance with the pressure differential in said brake pipe and in said reservoir.

17. In a fluid pressure brake, the combination with a brake pipe, a chamber adapted to be charged with fluid under pressure from said pipe and a slide valve having a seat and normally pressed into engagement with said seat by the pressure of fluid in said chamber, of a passage connecting said pipe to the seat of said slide valve, said slide valve having a restricted port adapted to register with said passage for establishing communication through which fluid under pressure is supplied to said chamber, means for preventing the pressure of fluid in said passage from pushing said valve from its seat, said means comprising a valve having one position for connecting a portion of the seating face of said slide valve to the atmosphere for increasing the seating pressure of said slide valve, and another position for connecting brake pipe pressure to said portion of the seating face of said slide valve for normalizing the seating pressure of said slide valve, an abutment subject to variations in brake pipe pressure and the pressure of fluid in said chamber and operated by a predetermined differential in said pressures for moving said valve from its second mentioned position to its first mentioned position.

18. In a fluid pressure brake, the combination with a brake pipe, auxiliary reservoir, and a brake controlling valve device having two release positions, of an additional reservoir, said valve device establishing communication for the flow of fluid from the auxiliary reservoir to said additional reservoir in both release positions and for the flow of fluid from the additional reservoir to the auxiliary reservoir in only one of said positions.

19. In a fluid pressure brake, the combination with a brake pipe, auxiliary reservoir, and a brake controlling valve device subject to the opposing pressures of the brake pipe and auxiliary reservoir and having two release positions in which said auxiliary reservoir is charged with fluid under pressure from the brake pipe, of an additional reservoir, said valve device establishing communication for the flow of fluid from the auxiliary reservoir to the additional reservoir in both positions and for the flow of fluid from the additional reservoir to the auxiliary reservoir in only one of said positions.

20. The combination of an auxiliary reservoir; a supplemental reservoir; a triple valve of the type which moves from normal release position to an inner release position against yielding resistance, the triple valve including a port which connects said reservoirs in release position; and flow controlling means, including a valve which opens to permit free flow in said port toward said supplemental reservoir, and closes to restrict flow from said supplemental reservoir toward the auxiliary reservoir, the restriction being such that on forward cars in a train, back-flow from the supplemental to the auxiliary reservoir in release position will not materially resist motion to said inner release position.

21. In a fluid pressure brake system, in combination, an auxiliary reservoir, an emergency reservoir, a brake controlling valve device having a normal release position and an inner release position and being operable to an application position to effect an application of the brakes, said brake controlling valve device being operable in said normal release position to establish a communication between said auxiliary reservoir and said emergency reservoir and being operable to close said communication when in said inner release position, and valve means associated with said communication for restricting flow of fluid from said emergency reservoir to said auxiliary reservoir and permitting free flow from said auxiliary reservoir to said emergency reservoir.

22. In a fluid pressure brake system, in combination, an auxiliary reservoir; an emergency reservoir; a brake controlling valve device having a normal release position, an inner release position and an application position and being operable in said application position to effect an application of the brakes, said brake controlling valve device being operable in said normal release position to establish a communication between said auxiliary reservoir and said emergency reservoir and being operable to close said communication when in said inner release position; valve means associated with said communication for restricting flow of fluid from said emergency reservoir to said auxiliary reservoir and permitting free flow from said auxiliary reservoir to said emergency reservoir; and yielding means for opposing movement of said brake controlling valve device to said inner release position.

23. In a fluid pressure brake, the combination with a brake pipe, of a brake controlling valve device comprising a slide valve and a piston for operating said valve and having a passage through which fluid under pressure from the brake pipe is supplied to the seat of said valve, and valve means operated upon an increase in brake pipe pressure for cutting off communication from the brake pipe through said passage to the seat of said valve.

24. In a fluid pressure brake, the combination with a brake pipe and auxiliary reservoir, of a brake controlling valve device comprising a slide valve and a piston for operating said valve and having a passage through which fluid under pressure is supplied from the brake pipe to the seat of said valve, and valve means subject to the opposing pressures of the auxiliary reservoir and brake pipe and operated upon an increase in brake pipe pressure for cutting off communication from the brake pipe through said passage to said valve seat.

CLYDE C. FARMER.